US011639829B2

(12) United States Patent
Sandgren

(10) Patent No.: US 11,639,829 B2
(45) Date of Patent: May 2, 2023

(54) GASKET AND ASSEMBLY FOR A PLATE HEAT EXCHANGER

(71) Applicant: ALFA LAVAL CORPORATE AB, Lund (SE)

(72) Inventor: Martin Sandgren, Malmö (SE)

(73) Assignee: ALFA LAVAL CORPORATE AB, Lund (SE)

(*) Notice: Subject to any disclaimer, the term of this patent is extended or adjusted under 35 U.S.C. 154(b) by 0 days.

(21) Appl. No.: 17/776,962

(22) PCT Filed: Oct. 20, 2020

(86) PCT No.: PCT/EP2020/079436
§ 371 (c)(1),
(2) Date: May 13, 2022

(87) PCT Pub. No.: WO2021/099048
PCT Pub. Date: May 27, 2021

(65) Prior Publication Data
US 2022/0404108 A1 Dec. 22, 2022

(30) Foreign Application Priority Data
Nov. 20, 2019 (EP) .................................... 19210337

(51) Int. Cl.
*F28F 3/10* (2006.01)
*F16J 15/06* (2006.01)
(52) U.S. Cl.
CPC ............... *F28F 3/10* (2013.01); *F16J 15/062* (2013.01); *F28F 2230/00* (2013.01)
(58) Field of Classification Search
CPC ......... F28F 3/10; F28F 2230/00; F16J 15/062
See application file for complete search history.

(56) References Cited

U.S. PATENT DOCUMENTS 4,377,204 A 3/1983 Johansson
5,110,691 A 5/1992 Krasij et al.
(Continued)

FOREIGN PATENT DOCUMENTS

CN 2876682 Y 3/2007
CN 203572294 U 4/2014
(Continued)

OTHER PUBLICATIONS

International Search Report (PCT/ISA/210) and Written Opinion (PCT/ISA/237) dated Dec. 11, 2020, by the European Patent Office as the International Searching Authority for International Application No. PCT/EP2020/079436. (8 pages).
(Continued)

*Primary Examiner* — Devon Russell
(74) *Attorney, Agent, or Firm* — Buchanan Ingersoll & Rooney PC

(57) ABSTRACT

A plate heat exchanger gasket includes an elongate body and a first number of elongate projections projecting from an upper side of the body and extending along the gasket's longitudinal extension. Each projection is defined by a top and two opposing flanks extending from the top. Referring to a cross section perpendicular to the gasket longitudinal extension, for each of a second number of unsymmetrical projections of the projections, a first area defined by an outer flank of the flanks, the body upper side and a normal of the body upper side extending through the top of the unsymmetrical projection, is smaller than a second area defined by an inner flank of the flanks, the body upper side and the normal of the body upper side extending through the top of the unsymmetrical projection. This normal is displaced from a center normal of the body upper side.

15 Claims, 4 Drawing Sheets

(56) References Cited

U.S. PATENT DOCUMENTS

| | | | |
|---|---|---|---|
| 5,927,395 A | 7/1999 | Damiani | |
| 7,490,660 B2 | 2/2009 | Song | |
| 9,234,710 B2 | 1/2016 | Persson | |
| 11,333,449 B2 * | 5/2022 | Andersen | F28F 3/048 |
| 2001/0019790 A1 | 9/2001 | Regan et al. | |
| 2006/0249282 A1 | 11/2006 | Song | |
| 2016/0102923 A1 | 4/2016 | Persson | |
| 2017/0268832 A1 | 9/2017 | Christensen et al. | |
| 2019/0204024 A1 | 7/2019 | Hedberg | |

FOREIGN PATENT DOCUMENTS

| | | |
|---|---|---|
| CN | 203595447 U | 5/2014 |
| CN | 205715634 U | 11/2016 |
| CN | 107228582 A | 10/2017 |
| CN | 108885074 A | 11/2018 |
| CN | 208269703 U | 12/2018 |
| EP | 1722184 A2 | 11/2006 |
| EP | 2626661 A2 | 8/2013 |
| EP | 3001131 A1 | 3/2016 |
| GB | 842962 A | 8/1960 |
| JP | 2992719 B2 | 10/1999 |
| KR | 10-2005-0050625 A | 5/2005 |
| KR | 20080006585 U | 12/2008 |
| WO | 2016046119 A1 | 3/2016 |

OTHER PUBLICATIONS

English Translation of the Text of First Office Action dated Aug. 3, 2022, by the State Intellectual Property Office of People's Republic of China in corresponding Chinese Patent Application No. 202080080178.5. (4 pages).

* cited by examiner

GASKET AND ASSEMBLY FOR A PLATE HEAT EXCHANGER

TECHNICAL FIELD

The present invention relates to a gasket for a plate heat exchanger and its design. The present invention also relates to an assembly for a plate heat exchanger comprising such a gasket.

BACKGROUND OF INVENTION

Plate heat exchangers typically consist of two end plates in between which a number of heat transfer plates are arranged in an aligned manner, i.e. in a stack or pack. The heat transfer plates of a PHE may be of the same or different types and they may be stacked in different ways. In some PHEs, the heat transfer plates are stacked with the front side and the back side of one heat transfer plate facing the back side and the front side, respectively, of other heat transfer plates, and every other heat transfer plate turned upside down in relation to the rest of the heat transfer plates. Typically, this is referred to as the heat transfer plates being "rotated" in relation to each other. In other PHEs, the heat transfer plates are stacked with the front side and the back side of one heat transfer plate facing the front side and back side, respectively, of other heat transfer plates, and every other heat transfer plate turned upside down in relation to the rest of the heat transfer plates. Typically, this is referred to as the heat transfer plates being "flipped" in relation to each other.

The heat transfer plates are typically corrugated so as to comprise ridges extending in an upper plane, and valleys extending in a lower plane. In one type of well-known PHEs, the so called gasketed plate heat exchangers, gaskets are arranged between the heat transfer plates, more particularly in gasket grooves extending along outer edges and around port holes of the heat transfer plates. The gasket grooves may extend in the lower plane and/or in an intermediate plane arranged between the upper and lower planes. The intermediate plane could extend halfway between the upper and lower planes, i.e. be a so-called as half-plane. The end plates, and therefore the heat transfer plates, are pressed towards each other whereby the gaskets seal between the heat transfer plates. The gaskets define parallel flow channels between the heat transfer plates, one channel between each pair of heat transfer plates. Two fluids of initially different temperatures can flow through every second channel for transferring heat from one fluid to the other.

The fluids enter and exit the channels through inlet and outlet ports, respectively, which extend through the PHE and are formed by respective aligned port holes in the heat transfer plates and the gaskets sealing, completely or partly, around the port holes. The inlet and outlet ports communicate with inlets and outlets, respectively, of the PHE for feeding the fluids to and from the PHE.

For the plate heat exchanger not to leak, the gaskets must seal properly between the heat transfer plates. To achieve such proper sealing, the gaskets must have a suitable design. One type of known gaskets for plate heat exchangers comprises an elongate body having essentially parallel plane upper and lower surfaces arranged to face a respective one of two adjacent heat transfer plates. This type of gaskets further comprises longitudinal ribs projecting from the upper and/or the lower surface of the gasket body. The purpose of the ribs is to increase the sealing capacity of the gasket.

In a plate heat exchanger ready for operation, the end plates are pressed hard towards each other which subjects the gaskets between the heat transfer plates to great compression forces. Such compression forces may cause large shear stresses in the gaskets, especially on an inside of ribs not arranged centrally on the gasket body, at the border between the ribs and the gasket body. These large shear stresses may, in turn, cause damage to the gaskets with a resulting malfunctioning of the plate heat exchanger. Thus, even if these rib-provided gaskets have a good sealing capacity, they are prone to damage when compressed between two adjacent heat transfer plates in a plate heat exchanger.

SUMMARY

An object of the present invention is to provide a gasket for a plate heat exchanger which is which is less prone to being damaged under compression, but which is still capable of effectively sealing between two adjacent heat transfer plates in a plate heat exchanger. The basic concept of the invention is to provide the gasket with at least one longitudinal rib or projection having a design causing less shear stresses in the gasket under compression. The gasket and an assembly comprising such a gasket for achieving the object above are defined in the appended claims and discussed in further detail below.

A gasket for a plate heat exchanger according to the present invention is arranged to seal between a first heat transfer plate of the plate heat exchanger and an adjacent second heat transfer plate of the plate heat exchanger. The gasket comprises an elongate body extending, in a thickness or height direction of the gasket, between parallel imaginary first and second planes. A lower side of the body, which is arranged to face the first heat transfer plate, faces the imaginary first plane. An opposing upper side of the body, which is arranged to face the second heat transfer plate, faces the imaginary second plane. The gasket further comprises a first number ≥1 of elongate projections projecting from the upper side of the body. The projections extend along a longitudinal extension of the gasket. Each of the projections is defined by a top and two opposing flanks extending from the top to the body of the gasket. A width direction of the gasket extends perpendicular to the thickness direction and the longitudinal extension of the gasket. The gasket is characterized in that, with reference to a cross section through, and perpendicular to the longitudinal extension of, the gasket, for each of a second number ≥1 of unsymmetrical projections of said projections, a first area, which is defined by an outer flank of said flanks, the upper side of the body and a normal of the upper side of the body extending through the top of the unsymmetrical projection, is smaller than a second area, which is defined by an inner flank of said flanks, the upper side of the body and said normal of the upper side of the body extending through the top of the unsymmetrical projection. This normal is displaced from a center normal of the upper side of the body, which center normal is aligned with a longitudinal center axis of the gasket body. This means that the unsymmetrical projection is not centrally arranged on the gasket body. Further, the body forms a ledge on a respective outside of the outer flanks of the unsymmetrical projections.

The gasket may comprise one or more projections, of which one or more is unsymmetrical. The projections may also be referred to as ribs, protrusions, edges, strips, etc. If the gasket comprises more than one projection, the projections may extend along each other, and some or all of the projections may, or may not, have a similar design. In case the gasket comprises precisely one projection, this is an unsymmetrical projection.

It should be stressed that the plural form of projection as well as unsymmetrical projection may be used herein for simplicity reasons even if there may be only one projection and unsymmetrical projection, respectively.

In case the gasket comprises more than one projection, the projections may be separated from, and/or extend parallel to, each other along part of or their complete lengths. In case the gasket comprises more than two projections, a distance between each two adjacent ones of the projections may be the same.

Throughout this text, the prefixes "inner" and "inside" mean that something is arranged closer to the longitudinal center axis of the gasket body than the corresponding "outer" and "outside" something.

It is typically at the ribs or projections not centrally arranged on the gasket body that large shear stresses may appear. The gasket design according to the present invention entails that one or more of the non-centrally arranged projections are unsymmetrical with respect to a respective plane of these projections extending through the respective projection top and perpendicular to said imaginary first and second planes. More particularly, inner portions of the unsymmetrical projections contain relatively much gasket material resulting in relatively small shear stresses in the gasket when this is compressed between the first and second heat transfer plates. Further, outer portions of the unsymmetrical projections contain relatively little gasket material which may enable relatively distinct, sharp or pointed unsymmetrical projections which, in turn, may improve the sealing capability of the gasket. Further, the ledge, plateau or shoulder on the outside of the unsymmetrical projections may result in reduced stresses in the gasket when this is compressed between the first and second heat transfer plates.

The ledge on the outside of each of the unsymmetrical projections may extend essentially parallel to the imaginary first and second planes, such as in the imaginary second plane, which may enable a, for sealing, optimum contact between the gasket and the first and second heat transfer plates.

According to one embodiment of the invention, the projections of the gasket comprise a center projection. A first flank of the flanks of this center projection, which first flank is arranged between the top of the center projection and a first unsymmetrical projection of said unsymmetrical projections, may have the same shape as the outer flank of the first unsymmetrical projection. This may enable a relatively distinct, sharp or pointed center projection which, in turn, may improve the sealing capability of the gasket. The center projection is arranged at a center portion of the gasket body and it may or may not be centrally arranged on the gasket body. The center projection may be symmetrical with respect to a plane extending through the center projection top and perpendicular to said imaginary first and second planes. The center projection may or may not be arranged between two unsymmetrical projections.

The design of the gasket may be such that the tops of the projections are defined by, or extend to, an imaginary third plane which is parallel to the imaginary first and second planes. Obviously, the imaginary second plane is arranged between the imaginary first and third planes. This embodiment entails that all projections are of equal height, which may result in a uniform gasket pressure.

The projections of the gasket according to the invention may be design in many different ways. According to one embodiment, with reference to said cross section of the gasket, a respective top portion of the projections is rounded. Thereby, the gasket may be less prone to being damaged. Further, such rounded top portions may facilitate proper alignment of the heat transfer plates between which the gasket is arranged to seal.

A first area, defined as specified above, which is smaller than a second area, also defined as specified above, can be obtained by different designs of the gasket.

According to one embodiment of the gasket, the area difference is obtained, with reference to said cross section of the gasket, for each of said unsymmetrical projections, by having the outer flank steeper than the inner flank. Such an embodiment may enable relatively distinct, sharp or pointed unsymmetrical projections which, in turn, may improve the sealing capability of the gasket.

Such a steeper outer flank may be obtained, with reference to said cross section of the gasket, for each of said unsymmetrical projections, by having the inner flank comprising a plane center portion and by having the outer flank curved and inwards bulging towards the body. Such an embodiment may enable relatively very small shear stresses in the gasket when this is compressed between the first and second heat transfer plates.

Alternatively, such a steeper outer flank may be obtained, with reference to said cross section of the gasket, for each of said unsymmetrical projections, by having both the inner and outer flanks curved and inwards bulging, but to different degrees, towards the body. Such an embodiment may enable relatively distinct, sharp or pointed unsymmetrical projections which, in turn, may improve the sealing capability of the gasket.

According to another embodiment of the gasket, the area difference is obtained, with reference to said cross section of the gasket, for each of said unsymmetrical projections, by having the inner flank curved and outwards bulging from the body and by having the outer flank curved and inwards bulging towards the body. Such an embodiment may enable relatively even smaller shear stresses in the gasket when this is compressed between the first and second heat transfer plates.

The gasket may be such that an imaginary fourth plane extending halfway between, and parallel to, the imaginary first and second planes is a symmetry plane of the body of the gasket. The gasket may be arranged to be received in a gasket groove of the first heat transfer plate and an opposing gasket groove in the second heat transfer plate. The gasket grooves typically have the same design. In such a case, a gasket comprising a symmetric body may provide for a good fit between the gasket and the first and second heat transfer plates.

The gasket may be so designed that a width of the unsymmetrical projections is larger than a width of another one of the projections, for example a center projection. Such an embodiment may make it easier to obtain a gasket having relatively distinct, sharp or pointed unsymmetrical projections and a first area, defined as specified above, which is smaller than a second area, also defined as specified above.

The gasket may comprise a field portion arranged to extend along respective outer edges of the first and second heat transfer plates, a port portion arranged to enclose a respective porthole of the first and second heat transfer plates and comprising an inner and an outer section, and a diagonal portion extending on an inside of the inner section of the port portion and between two sections of the field portion of the gasket. A thickness of the gasket within the field portion may be smaller than a thickness of the gasket within the diagonal portion. Alternatively/additionally, the thickness of the gasket within the field portion may be smaller than a thickness of the gasket within the inner section of the port portion. Typically, in a gasketed plate heat exchanger, gaskets may extend on both sides of one and the same heat transfer plate along outer edges and outer sections of the port holes of the heat transfer plate, while extending only on one side of the heat transfer plate along diagonals and inner sections of the port holes of the heat transfer plate. Two adjacent heat transfer plates in a plate heat exchanger will therefore support each other along the outer edges and outer sections of the port holes but not along the diagonals and inner sections of the portholes. By increasing the thickness of the gasket along the diagonals and inner sections of the portholes, a suitable gasket pressure, and thus a proper sealing, may be maintained.

Further, the gasket may be such that a width of the gasket within the field portion is larger than a width of the gasket within the diagonal portion. Alternatively/additionally, the width of the gasket within the field portion may be larger than a width of the gasket within the inner section of the port portion. By decreasing the width of the gasket where the thickness of the gasket is increased, an essentially uniform gasket volume along the gasket may be obtained.

An assembly for a plate heat exchanger according to the present invention comprises a gasket as described above and said first heat transfer plate. The first heat transfer plate comprises opposing first and second sides and an edge portion comprising corrugations extending between and in imaginary fifth and sixth planes. The imaginary fifth and sixth planes are parallel to an imaginary intermediate plane arranged between the imaginary fifth and sixth planes. The corrugations are arranged, at the first side of the heat transfer plate, to abut said second heat transfer plate, and at the second side of the heat transfer plate, to abut a third heat transfer plate, when the first heat transfer plate is arranged in a plate heat exchanger. The first heat transfer plate comprises a groove for receiving the gasket on the first side of the first heat transfer plate, wherein a bottom of the groove extends in the intermediate plane.

The intermediate plane may, or may not, be arranged halfway between the imaginary fifth and sixth planes The above described advantages of the different designs of the gasket according to the invention are transferable to the assembly for a plate heat exchanger according to the invention as this comprises the gasket.

BRIEF DESCRIPTION OF THE DRAWINGS

Further objects, features and advantages will appear from the following detailed description of embodiments of the invention with reference to the drawings, in which.

DETAILED DESCRIPTION OF EMBODIMENTS

Figure 1:
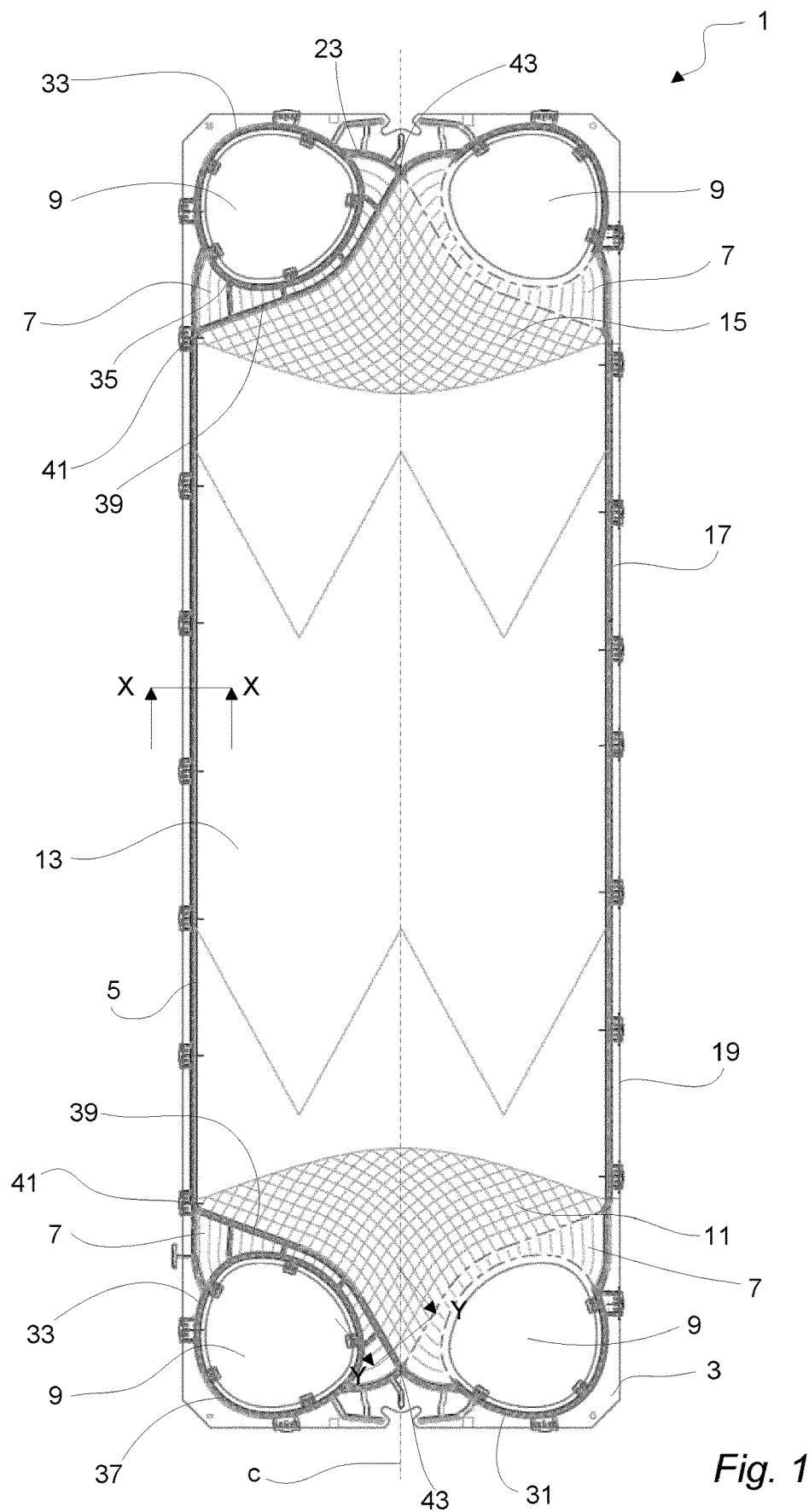
FIG. 1 is a schematic plan view of an assembly for a plate heat exchanger, which assembly comprises a first heat transfer plate and a gasket, FIG. 2 schematically illustrates a partial cross section of the assembly in FIG. 1 along line X-X, FIG. 3 schematically illustrates a partial cross section of the assembly in FIG. 1 along line Y-Y.
Figure 2:
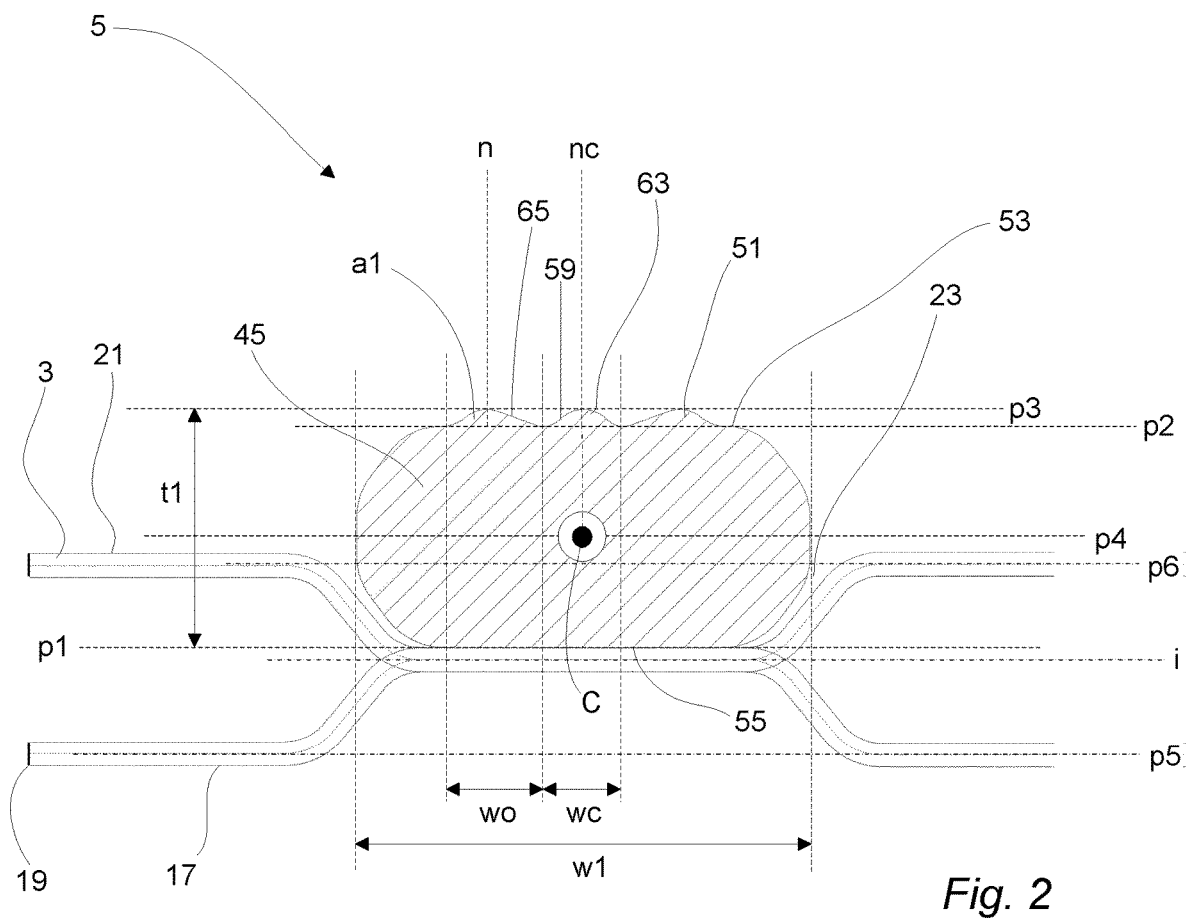
Figure 3:
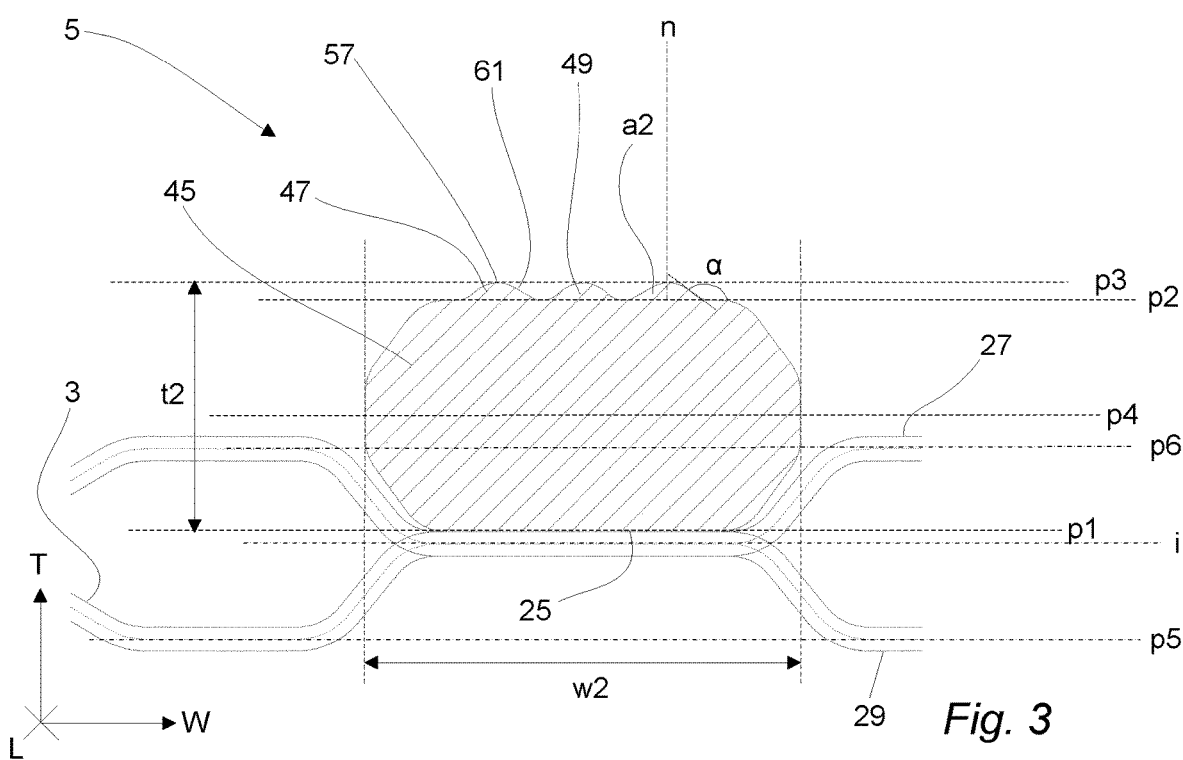
Figure 4:
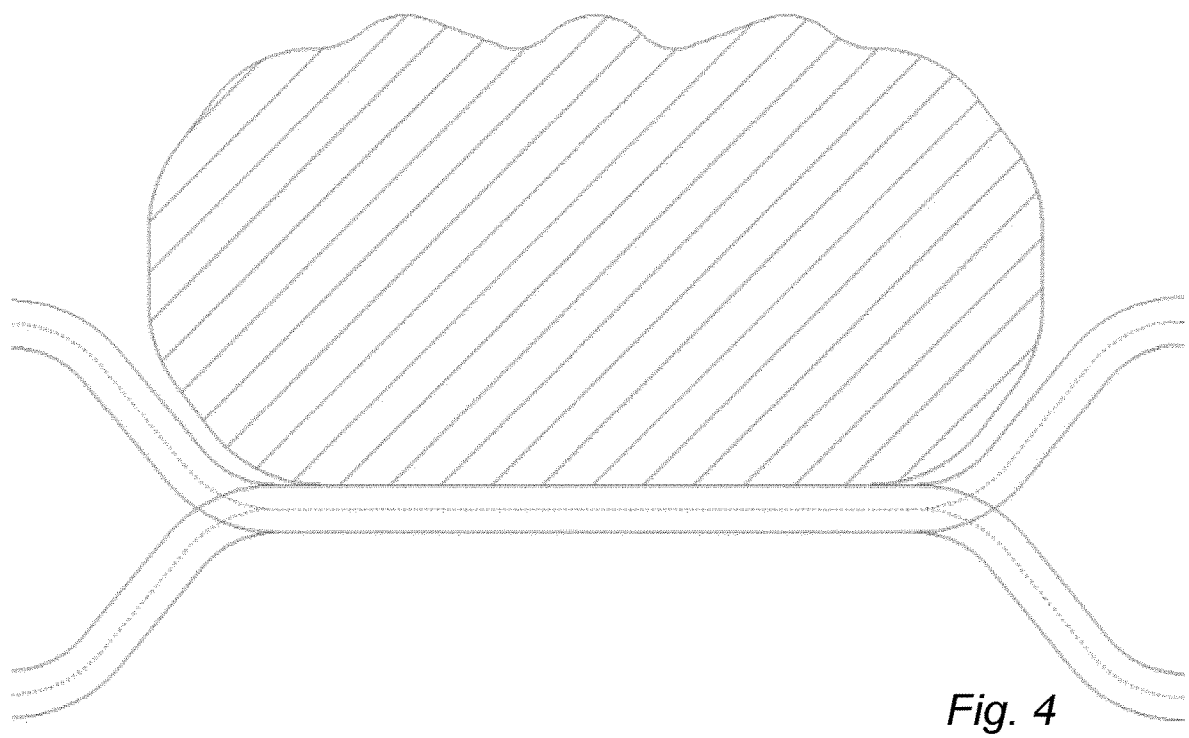
FIG. 4 is a repetition of part of FIG. 2, enlarged, where reference numerals, imaginary planes etc. have been removed for reasons of clarity, FIG. 5. is a repetition of part of FIG. 3, enlarged, where reference numerals, imaginary planes etc. have been removed for reasons of clarity.
Figure 5:
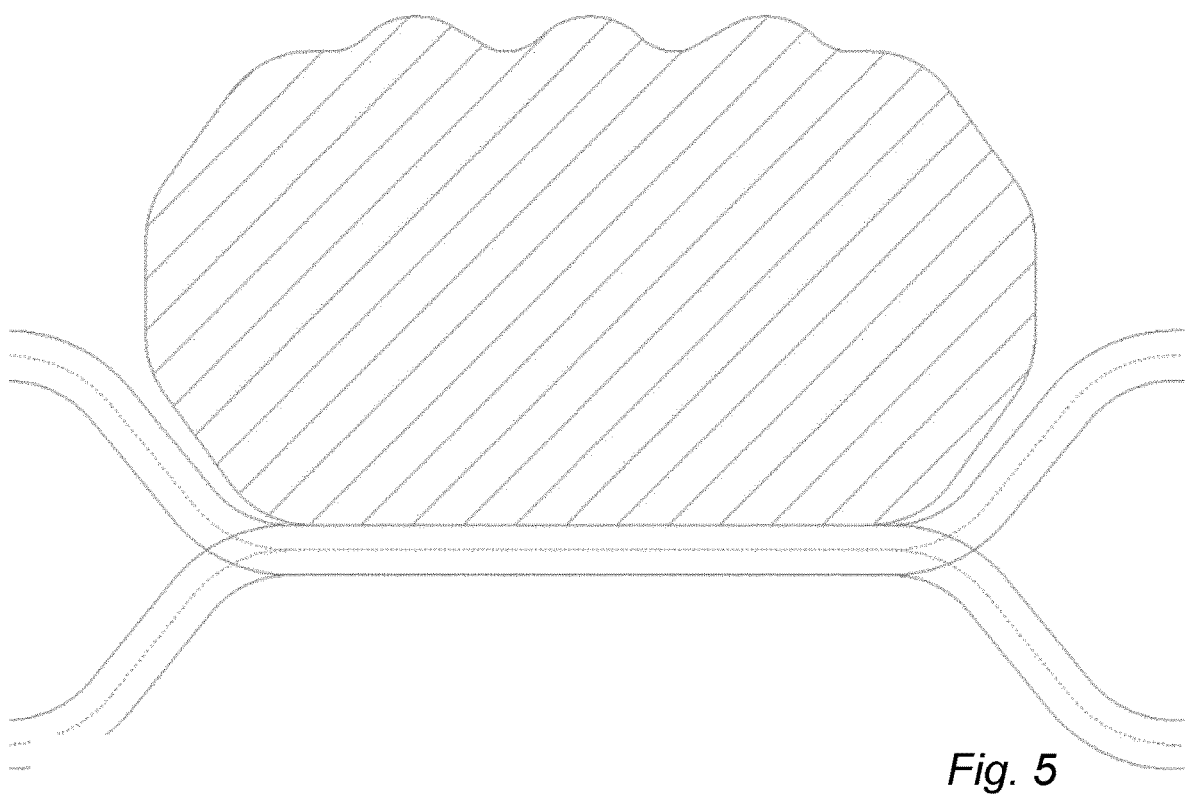

In FIGS. 1, 2 and 3 an assembly 1 for a plate heat exchanger (not illustrated) is shown. It comprises an essentially rectangular first heat transfer plate 3 of stainless steel and a rubber gasket 5. In the plate heat exchanger, the first heat transfer plate 3 is arranged between a second heat transfer plate and a third heat transfer plate, and the gasket 5 seals between the first heat transfer plate 3 and second heat transfer plate (not illustrated). The first, second and third heat transfer plates are of the same type, but in alternative embodiments they could be of different types. Further, with reference to the section of the text describing the background of the invention, the first, second and third heat transfer plates are "rotated" in relation to each other, but in alternative embodiments they could instead be "flipped" in relation to each other.

The first heat transfer plate 3 comprises four portholes 9 arranged in a respective corner of the first heat transfer plate 3. Different areas of the first heat transfer plate 3 are provided with different corrugation patterns, and the corrugation pattern within a specific plate area is adapted to the main function of this plate area. More particularly, the first heat transfer plate 3 comprises adiabatic areas 7 on an inside of the portholes 9, which adiabatic areas are provided with an adiabatic pattern. Further, the first heat transfer plate 3 comprises a first distribution area 11 provided with a distribution pattern, a heat transfer area 13 provided with a heat transfer pattern (only partially illustrated) and a second distribution area 15 provided with a distribution pattern, which areas are arranged in succession along a longitudinal center axis c of the first heat transfer plate 3. Further, an edge portion 17 of the first heat transfer plate 3 is provided with a corrugation pattern (not illustrated in FIG. 1). This corrugation pattern extends along most of an outer edge 19 of the first heat transfer plate 3 so as to give it a wave-shape. Corrugations 21 (FIG. 2) within the edge portion 17, and, depending on the plate type, possibly also corrugations within the first and second distribution areas 11 and 15, and/or the heat transfer area 13, extend between and in an imaginary fifth plane p5 and an imaginary sixth plane p6, which planes are illustrated in FIGS. 2 and 3. The first heat transfer plate 3 further comprises a groove 23 for receiving the gasket 5. A bottom 25 of the groove 23 extends in an intermediate plane i arranged halfway between, and parallel to, the imaginary fifth and sixth planes p5 and p6. With reference to FIG. 1, the groove 23 extends along the outer edge 19 of the first heat transfer plate 3 enclosing the portholes 9 thereof. Further, the groove 23 extends completely around two of the portholes 9 of the first heat transfer plate 3 enclosing the same, and diagonally between the adiabatic areas 7 most adjacent to the enclosed portholes 9 and the distribution areas 11.

Since the first, second and third heat transfer plates are all of the same kind, the above description of the first heat transfer plate 3 is valid also for the second and third heat transfer plates.

In the plate heat exchanger, a first side 27 of the first heat transfer plate 3 faces the second heat transfer plate while a second opposing side 29 of the first heat transfer plate 3 faces the third heat transfer plate. Arranged like that, the corrugations 21 within the edge portion 17 of the first heat transfer plate 3 abut the corrugations within the edge portions of the second and third heat transfer plates. Simultaneously, the gasket 5, arranged in the groove 23 of the first heat transfer plate 3, is compressed between the first and second heat transfer plates. A similar gasket is correspondingly arranged, and compressed between, the second and third heat transfer plates.

To fit in the groove 23, the gasket 5 comprises, with reference to FIG. 1, a field portion 31 extending along the outer edge 19 of the first heat transfer plate 3. Further, the gasket 5 comprises two port portions 33 enclosing a respective one of the portholes 9 of the first heat transfer plate 3. Each of the port portions 33 consist of an inner section 35 and an outer section 37. Furthermore, the gasket 5 includes two diagonal portions 39, which each extend between two sections 41 and 43 of the field portion 31, on an inside of a respective one of the inner sections 35 of the port portions 33.

With reference to FIGS. 2 and 3, which illustrate the gasket 5 in an unloaded state, the gasket 5 comprises a body 45 extending, in a thickness direction T (FIG. 3), between parallel imaginary first and second planes p1 and p2. An upper side 53 of the body 45 is arranged to face the second heat transfer plate while a lower side 55 of the body 45 is arranged to face the first heat transfer plate 3. The body 45 is symmetric with respect to an imaginary fourth plane p4 extending parallel to, and halfway between, the imaginary first and second planes p1 and p2. The gasket 5 further comprises an outer first unsymmetrical projection 47, a symmetrical center projection 49 and an outer second unsymmetrical projection 51 projecting from the upper side 53 of the body 45 to an imaginary third plane p3 which is parallel to the imaginary first and second planes p1 and p2. The center projection 49 is centrally arranged on the gasket body 45 while the first and second unsymmetrical projections 47 and 51 are arranged on opposite sides of, and on the same distance from, the center projection 49. The projections 47, 49 and 51 are elongate so as to form ribs and extend, separated from each other and in parallel, along a longitudinal extension L (FIG. 3) of the gasket 5. Each of the projections 47, 49 and 51 is defined by a top 57 and two opposing flanks 59 (left one in FIGS. 2 and 3) and 61 (right one in FIGS. 2 and 3) extending from the top 57 to the body 45 of the gasket 5. The tops 57 and flanks 59 and 61 are designed so as to give the projections 47, 49 and 51 a respective rounded top portion 63.

The outer flank 59 of the first unsymmetrical projection 47 and the flank 59 (first flank in the claims) of the center projection 49 have the same shape and are curved and inwards bulging towards the body 45 of the gasket 5. Similarly, the outer flank 61 of the second unsymmetrical projection 51 and the flank 61 of the center projection 49 have the same shape and are curved and inwards bulging towards the body 45 of the gasket 5. The flanks 59 and 61 of the center projection 49 have the same shape but are mirrorings of each other.

The outer flank 59 of the first unsymmetrical projection 47 is steeper than the inner flank 61 of the first unsymmetrical projection 47. The inner flank 61 of the first unsymmetrical projection 47 is not curved throughout, i.e. all the way or along its complete extension, but comprises a plane center portion 65. Further, with a width direction W (FIG. 3) of the gasket 5 extending perpendicular to the the thickness direction T and the longitudinal extension L, the first unsymmetrical projection 47 has a width wo, while the center projection 49 has a width wc, wo being larger than wc. With this design of the projections 47, 49 and 51, the first unsymmetrical projection 47 is unsymmetrical with respect to a normal n of the upper side 53 of the body 45 extending through the top 57 of the first unsymmetrical projection 47. Since the first unsymmetrical projection 47 is not centrally arranged on the gasket body 45, the normal n is displaced from a center normal nc of the upper side 53 of the gasket body 45 which center normal nc is aligned with a longitudinal center axis C (FIG. 2) of the body 45. The center normal nc extends through the top 57 of the center projection 49.

With respect to the cross sections illustrated in FIGS. 2 and 3, a first area a1, defined by the outer flank 59 of the first unsymmetrical projection 47, the upper side 53 of the body 45 and said normal n, is smaller than a second area a2, defined by the inner flank 61 of the first unsymmetrical projection 47, the upper side 53 of the body 45 and said normal n. The inner flank 61 of the first unsymmetrical projection 47 and the inner flank 59 of the second unsymmetrical projection 51 are mirrorings of each other.

On a respective outside of the first and second unsymmetrical projections 49 and 51, the upper side 53 of the body 45 forms a plane ledge extending in the imaginary second plane p2.

Even if the gasket 5 is designed as specified above along essentially its complete extension, the different portions of the gasket 5 have different cross sections, a cross section of the field portion 31 and the outer sections 37 of the port portions 33 being illustrated in FIG. 2, and a cross section of the diagonal portions 39 and the inner sections 35 of the port portions 33 being illustrated in FIG. 3. As is clear from the figures, the imaginary second and third planes p2 and p3 are arranged on a larger distance from the imaginary first plane p1 along the diagonal portions 39 and the inner sections 35 of the port portions 33 than along the field portion 31 and the outer sections 37 of the port portions 33. The distance between the planes p2 and p3 is however constant. Consequently, a thickness t1 of the gasket 5 along the field portion 31 and the outer sections 37 of the port portions 33 is smaller than a thickness t2 of the gasket 5 along the diagonal portions 39 and the inner sections 35 of the port portions 33. Thus, here, the thickness of the gasket 5 is the same along the field portion 31 and the outer sections 37 of the port portions 33, but this need not be the case in alternative embodiments. Similarly, here, the thickness of the gasket 5 is the same along the diagonal portions 39 and the inner sections 35 of the port portions 33, but this need not be the case in alternative embodiments. Further, a width w1 of the gasket 5 along the field portion 31 and the outer sections 37 of the port portions 33 is larger than a width w2 of the gasket 5 along the diagonal portions 39 and the inner sections 35 of the port portions 33. Further, the projections 47, 49 and 51 are arranged a little bit closer to each other along the diagonal portions 39 and the inner sections 35 of the port portions 33 than along the field portion 31 and the outer sections 37 of the port portions 33. Thus, here, the width of the gasket 5 is the same along the field portion 31 and the outer sections 37 of the port portions 33, but this need not be the case in alternative embodiments. Similarly, here, the width of the gasket 5 is the same along the diagonal portions 39 and the inner sections 35 of the port portions 33, but this need not be the case in alternative embodiments.

Figure 6:
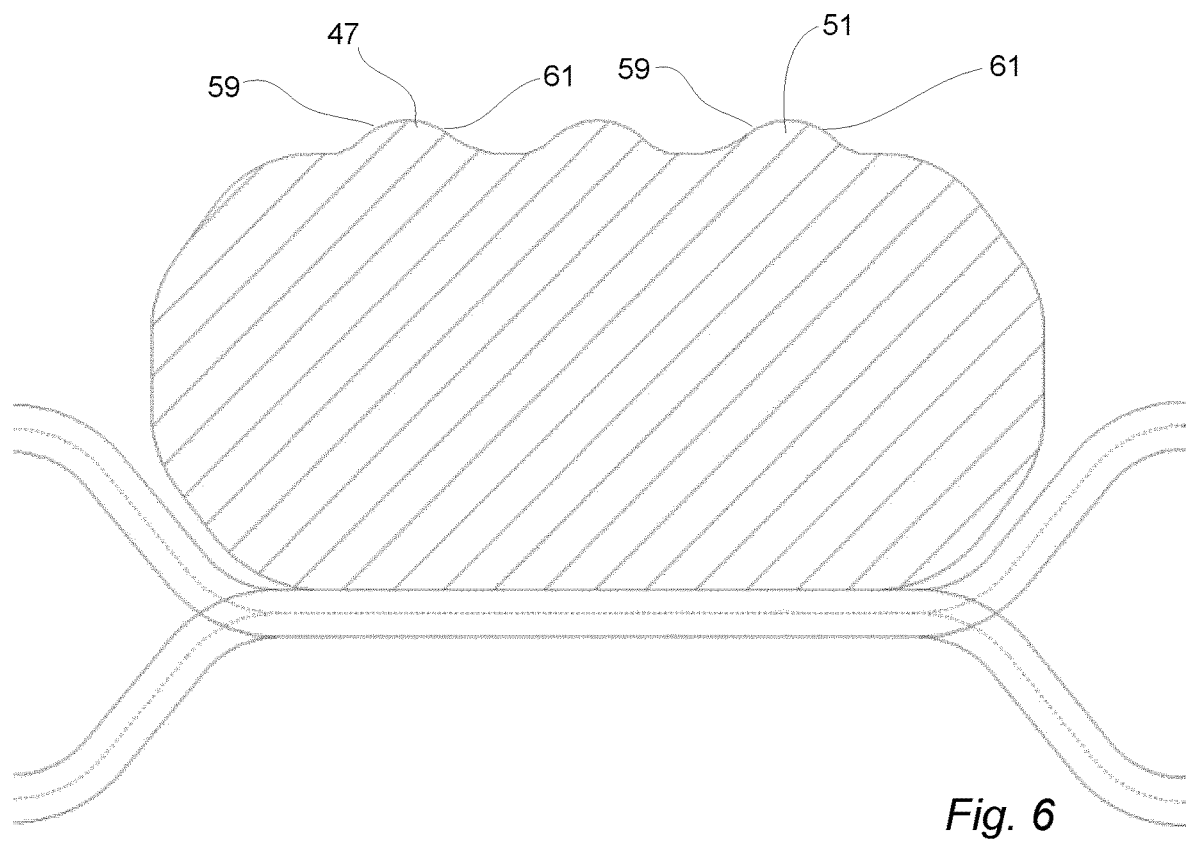
FIG. 6 illustrates the same as FIG. 2 but for another embodiment.
Figure 7:
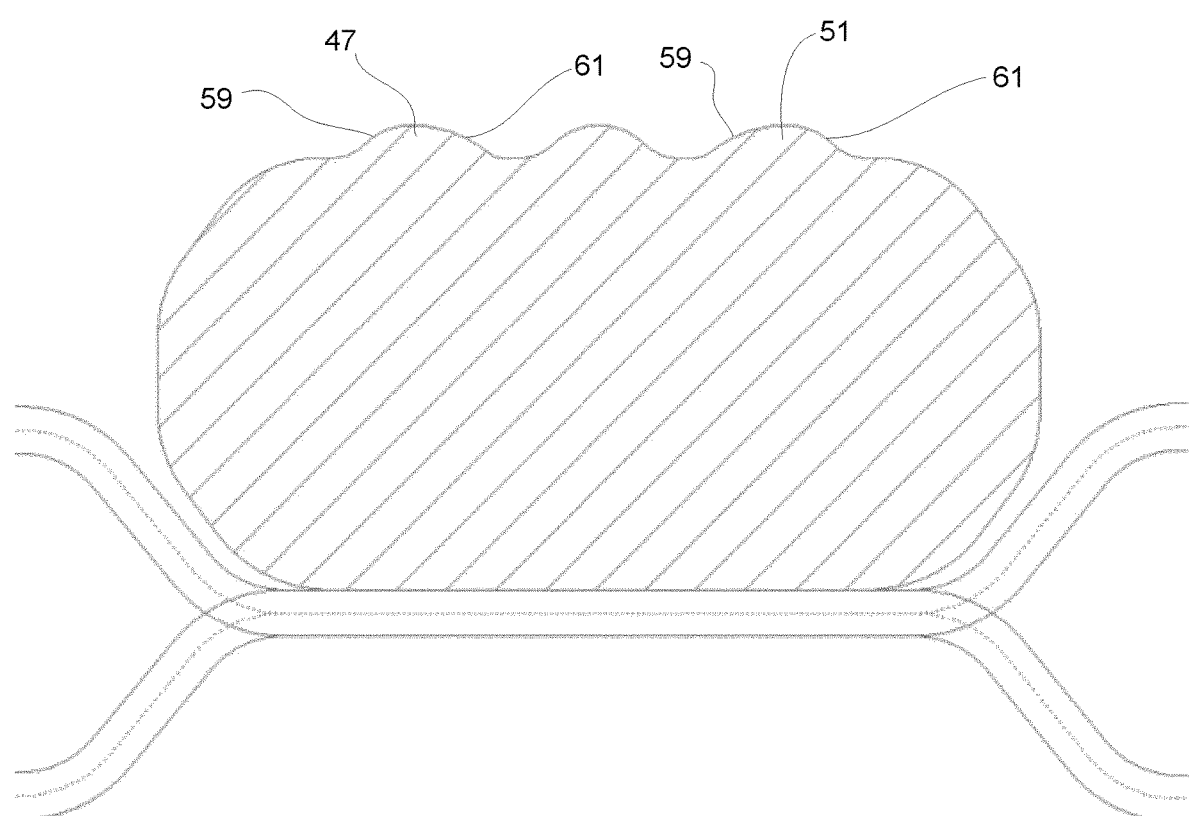
FIG. 7 illustrates the same as FIG. 2 but for yet another embodiment.

In the above described embodiment, different areas a1 and a2 of the first and second unsymmetrical projections 47 and 51 are achieved by means of outer flanks 59 and 61, respectively, being inwards bulging and inner flanks 61 and 59, respectively, comprising a respective plane center portion 65. Different areas a1 and a2 could be obtained in alternative ways. According to a first alternative, which is illustrated in FIG. 6, the outer flanks 59 and 61, respectively, are still inwards bulging, while the inner flanks 61 and 59, respectively, also are inwards bulging, but less sharply, i.e. with a larger "radius" than the outer flanks. According to a second alternative, which is illustrated in FIG. 7, the outer flanks 59 and 61, respectively, are still inwards bulging, while the inner flanks 61 and 59, respectively, are outwards bulging from the body 45.

The above described embodiments of the present invention should only be seen as examples. A person skilled in the art realizes that the embodiments discussed can be varied and combined in a number of ways without deviating from the inventive conception.

As an example, the number of gasket projections need not be three, but could be more or less. Similarly, the number of unsymmetrical projections need not be two, but could be more or less. Further, the design of the projections can be varied endlessly. As an example, the projections could be more or less rounded than illustrated in the figures.

The gasket could also comprise projections projecting from the lower side of the gasket body. These projections could be designed like the projections projecting from the upper side of the gasket body.

The assembly illustrated in FIG. 1 is adapted for use in a plate heat exchanger of parallel flow type. Naturally, the present invention is equally applicable in connection with a plate heat exchanger of diagonal flow type.

The projections need not all have the same height. As an example, the first and second unsymmetrical projections could be higher than the center projection, or it could be the other way around.

The first and second unsymmetrical projections need not be mirrorings of each other but could have differing designs.

The upper side of the body of the gasket need not extend in the imaginary second plane along its complete/part of its extension. As an example, the upper side of the body of the gasket could be more or less roof-top shaped, i.e. comprise two planes inclined in relation to each other, and pointed in a direction away from the lower side of the body. Such a gasket body would have a thickness at a center of the body which would be greater than a thickness at edges of the body, which, in the end, could result in an increased contact pressure between the gasket and the heat transfer plates.

The portions of the gasket need not be integrally formed. For example, the port portions can be separate from the rest of the gasket.

Herein, the ledges or plateaus on the outside of the unsymmetrical projections are portions of the upper side of the gasket body extending with different inclination than the outer flanks of the unsymmetrical projections. More particularly, for each of the unsymmetrical projections, the ledges extend in the imaginary second plane, as in the embodiments above, or between the imaginary first and second planes with an angle α (FIG. 3) which is less than 180 degrees with respect to a tangent to the outer flank at mid height, i.e. halfway between the second and third imaginary planes. Thus, in alternative embodiments, the ledges need not extend parallel to the imaginary first and second planes but could instead extend inclined with respect to the same.

The intermediate plane need not extend halfway between the imaginary fifth and sixth planes but could be displaced upwards or downwards together with the bottom of the gasket groove.

The bottom of the gasket groove need not extend in so called half-plane but could extend in a lower plane of the plate, i.e. the plane above referred to as the imaginary fifth plane.

The porthole gasket may be made of another material than rubber. Similarly, the heat transfer plates could be made of another material than stainless steel, such as titanium or aluminium.

The gaskets could be arranged to be fastened to the heat transfer plates in different ways, for example by glue, adhesive tape or some kind of fastening means, for example so called clip-on tabs as illustrated in FIG. 1, comprised in the gaskets and arranged to engage with the heat transfer plates.

It should be stressed that a description of details not relevant to the present invention has been omitted and that the figures are just schematic and not drawn according to scale. It should also be said that some of the figures have been more simplified than others. Therefore, some components may be illustrated in one figure but left out in another figure. Finally, as used herein, the prefixes "first", "second", "top", "bottom", "upper", "lower", "horizontal", "vertical" etc. are used only to distinguish between different components and pose no requirements as regards relative positioning or orientation.

The invention claimed is:

1. A gasket for a plate heat exchanger arranged to seal between a first heat transfer plate of the plate heat exchanger and an adjacent second heat transfer plate of the plate heat exchanger, the gasket comprising an elongate body extending, in a thickness direction of the gasket, between parallel imaginary first and second planes, a lower side of the body, which is arranged to face the first heat transfer plate, facing the imaginary first plane, and an opposing upper side of the body, which is arranged to face the second heat transfer plate, facing the imaginary second plane, the gasket further comprising a first number of elongate projections projecting from the upper side of the body and extending along a longitudinal extension of the gasket, each of the projections being defined by a top and two opposing flanks extending from the top to the body of the gasket, a width direction of the gasket extending perpendicular to the thickness direction and the longitudinal extension of the gasket, characterized in that, with reference to a cross section through, and perpendicular to the longitudinal extension of, the gasket, for each of a second number of unsymmetrical projections of said projections, a first area defined by an outer flank of said flanks, the upper side of the body and a normal of the upper side of the body extending through the top of the unsymmetrical projection, is smaller than a second area defined by an inner flank of said flanks, the upper side of the body and said normal of the upper side of the body extending through the top of the unsymmetrical projection, which normal is displaced from a center normal of the upper side of the body aligned with a longitudinal center axis of the body, and the body forms a ledge on a respective outside of the outer flanks of said unsymmetrical projections.

2. A gasket according to claim 1, which ledge extends essentially parallel to the imaginary first and second planes.

3. A gasket according claim 1, wherein a first flank of said flanks of a center projection of said projections, which first flank is arranged between the top of the center projection and a first unsymmetrical projection of said unsymmetrical projections, has the same shape as the outer flank of the first unsymmetrical projection.

4. A gasket according to claim 1, wherein the tops of the projections are defined by an imaginary third plane which is parallel to the imaginary first and second planes.

5. A gasket according to claim 1, wherein, with reference to said cross section, a respective top portion of the projections is rounded.

6. A gasket according to claim 1, wherein, with reference to said cross section, for each of said unsymmetrical projections, the outer flank is steeper than the inner flank.

7. A gasket according to claim 1, wherein, with reference to said cross section, for each of said unsymmetrical projections, the inner flank comprises a plane center portion and the outer flank is curved and inwards bulging towards the body.

8. A gasket according to claim 1, wherein, with reference to said cross section, for each of said unsymmetrical projections, the inner and outer flanks are curved and inwards bulging towards the body.

9. A gasket according to claim 1, wherein, with reference to said cross section, for each of said unsymmetrical projections, the inner flank is curved and outwards bulging from the body and the outer flank is curved and inwards bulging towards the body.

10. A gasket according to claim 1, wherein an imaginary fourth plane extending halfway between, and parallel to, the imaginary first and second planes is a symmetry plane of the body of the gasket.

11. A gasket according to claim 1, wherein a width of the unsymmetrical projections is larger than a width of another one of the projections.

12. A gasket according to claim 1, comprising a field portion arranged to extend along respective outer edges of the first heat transfer plate and the second heat transfer plate, a port portion arranged to enclose a respective porthole of the first and second heat transfer plates and comprising an inner and an outer section, and a diagonal portion extending on an inside of the inner section of the port portion and between two sections of the field portion of the gasket, wherein a thickness of the gasket within the field portion is smaller than a thickness of the gasket within the diagonal portion.

13. A gasket according to claim 12, wherein the thickness of the gasket within the field portion is smaller than a thickness of the gasket within the inner section of the port portion.

14. A gasket according to claim 12, wherein a width of the gasket within the field portion is larger than a width of the gasket within the diagonal portion and a width of the gasket within the inner section of the port portion.

15. An assembly for a plate heat exchanger comprising a gasket according to claim 1 and said first heat transfer plate, said first heat transfer plate comprising opposing first and second sides and an edge portion comprising corrugations extending between and in imaginary fifth and sixth planes which are parallel to an imaginary intermediate plane arranged between the imaginary fifth and sixth planes, the corrugations being arranged, at the first side of the heat transfer plate, to abut said second heat transfer plate, and at the second side of the heat transfer plate, to abut a third heat transfer plate, when the first heat transfer plate is arranged in a plate heat exchanger, wherein the first heat transfer plate comprises a groove for receiving the gasket on the first side of the first heat transfer plate, wherein a bottom of the groove extends in the intermediate plane.

* * * * *